Reissued Apr. 18, 1933

Re. 18,797

UNITED STATES PATENT OFFICE

FREDERICK RIEBEL, JR., OF TOLEDO, OHIO, ASSIGNOR TO AIR-WAY ELECTRIC APPLIANCE CORPORATION, OF TOLEDO, OHIO, A CORPORATION OF DELAWARE

AIR-POROUS PAPER AND PROCESS OF MAKING SAME

No Drawing. Original No. 1,854,427, dated April 19, 1932, Serial No. 471,600, filed July 29, 1930. Application for reissue filed October 3, 1932. Serial No. 636,090.

In the development of the paper making art, it has been constantly endeavored to increase the closeness of fibre lay in the felted structure. Such type of structure, while leading in the direction of tensile strength, is diametrically opposed to porosity. On the other hand, where attention has been given to the development of a paper structure capable of providing filtering interstices, as in the case of filter-paper making, the structure has lacked tensile strength. These respective properties of tensile strength and porosity have in fact constituted contradictory functions, as to direct the art along the lines of the making of a product of good tensile strength and without porosity. Paper having a structure providing high porosity for air, and yet at the same time having a high tensile strength, is accordingly a novel conception in the art, and one affording utilities along new and important lines.

To the accomplishment of the foregoing and related ends, the invention, then, consists of the features hereinafter fully described, and particularly pointed out in the claims, the following description setting forth in detail certain illustrative embodiments of the invention, these being indicative however of but a few of the various ways in which the principle of the invention may be employed.

In its general aspects, the invention contemplates the preparation of paper which is not only highly porous to air, but which is also of a high tensile strength at the same time.

In the manufacture of paper customarily, the pulped stock is treated in a beating engine, with prolonged beating to provide a fluent mass in the form of a suspension of the fibers in water, the fibers being brought to a state of considerable isolation. The material is then treated in a Jordan engine for further refining and breaking up of finer masses, such treatment conducing to a close lay and matting when subsequently run onto the forming wire. When well beaten and refined, the mass is supplied to the machine, a Fourdrinier machine typically, and the shaking is adjusted to afford a maximum of close matting in the fibre lay. As the Fourdrinier wire passes over the suction boxes, a vacuum is applied to withdraw water, but gently so as to avoid opening up the closely matted fibre structure. When dried, even though such paper be creped, where any degree of tensile strength is shown, the structure is characterized by a closely laid fibre matting having very low porosity to air applied under pressure. In fact, on application of air pressure to such paper, back pressure quickly builds up and rupture occurs.

In direct contrast to this, my present invention contemplates the production of a paper which has a high porosity to air flow, and which at the same time has the contradictory property of high tensile strength. The importance and utility of such a paper is particularly seen, when it is noted that it now makes possible air bags for vacuum cleaners, protective diaphragms for air-ventilated and cooled electric generators, motors, and other machinery where a considerable volume of air is to be supplied, without passing dust.

The lower limit of porosity, in paper suitable for use in making of dust collecting bags for vacuum cleaners, is approximately 25 c. f. m. (cubic feet of air per minute) of air flow under a pressure head represented by a pressure drop across a 11¾″ square sheet of the paper, read on a water manometer as 2″ of pressure.

It is understood that the above porosity requirement relates to the average vacuum cleaner requirements and depends on the strength of the average vacuum cleaner blower. In other words, the stronger the blower, the more porosity a paper requires in order that it may not back up too much pressure against the blower and thereby interfere with the suction producing capacity of the blower.

As stock for the production of the present paper, I may primarily employ various materials, depending somewhat upon particular results in view, in general the fibers being of rather long character, for instance, rag stock, sulphite stock, sulphate stock, etc., preferably the latter for paper for quite high tensile strength. The stock, then instead of being thoroughly beaten and Jordaned as in accordance with customary practice, is on the contrary very lightly beaten, just sufficiently to form an evenly flowing suspension, which is then run onto the forming wire, and felted, but with a relatively close lay. The shaking frames are desirably turned down from their adjustment to avoid the customary action. Or, in some cases I employ a machine having a very short shaking frame section. At the suction boxes, instead of the customary vacuum, I apply much more, two to four times as much, and by means of such abrupt vacuum pull, which may be achieved conveniently by slowing down the speed of the machine so that a given area of the pulp is subjected to from two to four times the amount of vacuum action as it passes over the suction boxes, I disruptively open the interstices of the felted structure. The words "abrupt suction" are thus understood to be used in the sense that with the machine speed reduced to one-quarter normal speed the pulp receives as much suction action while passing one-quarter of the way across the suction boxes as it would receive in passing wholly across the suction box at normal speed, i. e., that speed at which a present day paper mill is run for kraft paper of the same basis weight. The web is now preferably machine creped.

Prior to beating in the Jordan machine, the stock is allowed to remain in suspension just long enough to reach an initial stage of hydration. The type of stock produced in the practice of my invention has characteristics of what is known as wild fibre stock.

This paper has a weight of not less than 30 lbs. per ream and shows a fibre structure meshed to supply free interstices of a size to be impervious to particles the size of wheat flour, while being freely pervious to air so as to pass 25 cubic feet of air per minute through a 11¾″ square sheet of such paper without backing up pressure more than two inches as measured on a water manometer. In this test there is used a standard testing instrument providing a paper exposure 11¾″ square to the discharge of a blower fan.

A sheet of such paper as applied to the air testing instrument noted, and then subjected to impacts from an impact device for determining sheet strength shows resistance against rupture by a 0.24 lb. wooden ball swinging against the perpendicular face of the sheet through as much as a 36 inch arc (of 100 inch radius). If desired, more resistance to rupture may in fact also be had.

Indeed, paper may be made in accordance with the foregoing method and having the other defined characteristics, which will resist rupture where such test ball is dropped through an arc of fifty inches, or even where dropped through a distance corresponding to 60° of arc.

The "wooden ball" employed in making the foregoing test may be more accurately defined as a ball of the specified viz. 0.24 lb. and implies a diameter not greater than approximately one and one-half inches; and I do not claim, as coming within the scope of the present invention, any paper having the other defined characteristics which does not in addition under normal conditions of temperature and humidity, resist the impact of a 0.24 lb. ball of approximately one and one-half inches diameter falling through a 36 inch arc having a radius of one hundred inches. Accordingly, the term "wooden ball" as employed herein is to be understood as implying this limitation in diameter, it being obviously immaterial of what the ball be composed so long as a stated weight is confined within a spherical surface of a stated diameter.

Such paper when made up into a bag with an opening fitting a vacuum cleaner mounting, when subjected to the discharge of a blower driven by an electric motor operating on a 110 volt circuit and capable of producing a sealed-off suction head of 18 inches of water as measured on a manometer, shows a vacuum of not less than ten inches. If now the bag be loaded with 0.66 lb. of wheat flour, the vacuum drops to six or not less than five inches, notwithstanding the distribution of all this mass of flour on the inner surface of the bag. If now such bag distended under the blower action be subjected to the impact test of a 0.24 lb. ball falling against the vertical surface of the bag through an arc of as much as 45 inches (on a 100 inch radius) there is no rupture. In fact, if desired, the rupture-resistance may be much greater than this.

As a further refinement of the invention, I may incorporate in the stock in the beating engine fibers of cotton, hemp, jute, etc., chopped manila or hemp rope, and the like. These fibers disseminate in the pulp suspension, forming in the web product interlacing strengthening fibers, whereby the porosity standards above noted may be maintained, while still further increasing the tensile strength of the sheet.

Other modes of applying the principle of the invention may be employed, change being made as regards the details described, provided the features stated in any of the following claims, or the equivalent of such, be employed.

I therefore particularly point out and distinctly claim as my invention:

1. An air-porous paper, having its fibers meshed to leave interstices impervious to particles the size of wheat flour, and transmitting air such as to occasion no more back pressure than about two inches against a blower forcing not less than substantially 25 cubic feet of air per minute through a 11¾″ square sheet of such paper, and having a tensile strength under such pressure resisting impact of an 0.24 lb. wooden ball falling through a 36 inch arc having a radius of 100 inches.

2. An air-porous paper, creped, and having its fibers meshed to leave interstices impervious to particles the size of wheat flour, and transmitting air such as to occasion no more back pressure than about two inches against a blower forcing not less than substantially 25 cubic feet of air per minute through a 11¾″ square sheet of such paper, and having a tensile strength under such pressure resisting impact of an 0.24 lb. wooden ball falling through a 36 inch arc having a radius of 100 inches.

3. An air-porous paper, of sulphate stock, of weight not less than 30 lbs. per ream, and having its fibers meshed to leave interstices impervious to particles the size of wheat flour, and transmitting air such as to occasion no more back pressure than about two inches against a blower forcing not less than substantially 25 cubic feet of air per minute through a 11¾″ square sheet of such paper, and having a tensile strength under such pressure resisting impact of an 0.24 lb. wooden ball falling through a 36 inch arc having a radius of 100 inches.

4. An air-porous paper, of sulphate stock, having its pulped structure including fibers of chopped rope, and meshed to leave interstices impervious to particles the size of wheat flour, and transmitting air such as to occasion no more back pressure than about two inches against a blower forcing not less than substantially twenty-five cubic feet of air per minute through a 11¾ inches square sheet of such paper, and having a tensile strength under such pressure resisting impact of an 0.24 lb. wooden ball falling through an 36 inch arc having a radius of 100 inches.

5. A process of making an air-porous paper comprising: providing a suspension in water of pulped cellulosic stock, beating the same just sufficiently to secure an initial stage of hydration, forming the same into a sheet with loosely felted lay having wild fibre characteristics, and, while still carrying water, subjecting the same to an abrupt heavy suction to open its interstices, whereby a combination of both porosity and strength is secured in the paper.

6. An air-porous paper, of sulphate stock, of weight not less than 30 lbs. per ream, and having its fibers meshed to leave interstices impervious to particles the size of wheat flour, and transmitting air such as to occasion no more back pressure than about two inches against a blower forcing not less than substantially twenty-five cubic feet of air per minute through a 11¾ inches square sheet of such paper, and having a tensile strength under such pressure resisting impact of an 0.24 lb. wooden ball falling through a fifty inch arc having a radius of 100 inches.

7. An air-porous paper, of sulphate stock, of weight not less than 30 lbs. per ream, and having its fibers meshed to leave interstices impervious to particles the size of wheat flour, and transmitting air such as to occasion no more back pressure than about two inches against a blower forcing not less than substantially twenty-five cubic feet of air per minute through a 11¾ inches square feet of such paper, and having a tensile strength under such pressure resisting impact of an 0.24 lb. wooden ball falling through an arc of sixty degrees having a radius of 100 inches.

8. An air-porous paper, of sulphate stock, only slightly hydrated, loosely felted, with wild fibre characteristics, of weight not less than 30 lbs. per ream, its fibers meshed to leave interstices impervious to particles the size of wheat flour, and transmitting air so as to occasion no more back pressure than about two inches against a blower forcing not less than substantially twenty-five cubic feet of air per minute through a 11¾ inches square sheet of such paper, and having a tensile strength under such pressure resisting impact of an 0.24 lb. wooden ball through a fifty inch arc having a radius of 100 inches.

FREDERICK RIEBEL, Jr.